(12) United States Patent
Asoodar et al.

(10) Patent No.: US 12,348,029 B2
(45) Date of Patent: Jul. 1, 2025

(54) AUXILIARY POWER SUPPLY FOR ENERGY STORAGE SYSTEMS

(71) Applicant: Hitachi Energy Ltd, Zürich (CH)

(72) Inventors: Mohsen Asoodar, Solna (SE); Lexuan Meng, Västerås (SE); Tong Wu, Västerås (SE); Jean-Philippe Hasler, Västerås (SE); Gunnar Ingeström, Västerås (SE)

(73) Assignee: Hitachi Energy Ltd, Zürich (CH)

( * ) Notice: Subject to any disclaimer, the term of this patent is extended or adjusted under 35 U.S.C. 154(b) by 0 days.

(21) Appl. No.: 18/867,154

(22) PCT Filed: Jun. 2, 2022

(86) PCT No.: PCT/EP2022/065119
§ 371 (c)(1),
(2) Date: Nov. 19, 2024

(87) PCT Pub. No.: WO2023/232260
PCT Pub. Date: Dec. 7, 2023

(65) Prior Publication Data
US 2025/0175030 A1     May 29, 2025

(51) Int. Cl.
*H02J 11/00*     (2006.01)
*H02J 50/10*     (2016.01)

(52) U.S. Cl.
CPC ............... *H02J 11/00* (2013.01); *H02J 50/10* (2016.02)

(58) Field of Classification Search
CPC .................................. H02J 11/00; H02J 50/10
(Continued)

(56) References Cited

U.S. PATENT DOCUMENTS

| 3,670,175 | A | 6/1972 | Zinck-Petersen |
| 8,686,693 | B2* | 4/2014 | Bhowmik ............. H02J 7/0014 |
| | | | 320/152 |

(Continued)

FOREIGN PATENT DOCUMENTS

| CN | 1739228 A | 2/2006 |
| CN | 101675578 A | 3/2010 |

(Continued)

OTHER PUBLICATIONS

IPEA European Patent Office, International Preliminary Report on Patentability, issued in PCT/EP2022/065119, completed on Sep. 9, 2024, 11 pages.

*Primary Examiner* — Alfonso Perez Borroto
(74) *Attorney, Agent, or Firm* — Procopio, Cory, Hargreaves & Savitch LLP (57) ABSTRACT

There is disclosed herein an energy storage system comprising an energy storage circuit, comprising a string of interconnected energy storage units configured to store electrical energy and provide power to a power grid using said stored electrical energy. The ESS further comprises an auxiliary module configured to provide auxiliary functions for at least one of the plurality of energy storage units, and an auxiliary power supply circuit for providing power to the auxiliary module from a grounded power source. The auxiliary power supply circuit is configured to galvanically isolate the energy storage circuit from the grounded power source, thereby preventing electrical arcing between the ESS, which may be at a high voltage, and ground at the grounded power source.

11 Claims, 7 Drawing Sheets

(58) Field of Classification Search
USPC .......................................................... 307/23
See application file for complete search history.

(56) References Cited

U.S. PATENT DOCUMENTS

| | | | |
|---|---|---|---|
| 9,093,862 B2* | 7/2015 | Dennis | H02J 3/46 |
| 2004/0084973 A1 | 5/2004 | Jakob et al. | |
| 2017/0141596 A1* | 5/2017 | Hansen | H02J 7/0047 |
| 2018/0248378 A1* | 8/2018 | Ren | H02J 3/381 |
| 2019/0214817 A1 | 7/2019 | Teichmann et al. | |

FOREIGN PATENT DOCUMENTS

| | | |
|---|---|---|
| CN | 103633733 A | 3/2014 |
| EP | 2160825 B1 | 12/2020 |
| KR | 101915244 B1 | 12/2018 |
| WO | 2004/045046 A1 | 5/2004 |
| WO | 2018061077 A1 | 4/2018 |

* cited by examiner

AUXILIARY POWER SUPPLY FOR ENERGY STORAGE SYSTEMS

CROSS-REFERENCE TO RELATED APPLICATIONS

The present application is a national stage entry of International Patent Application No. PCT/EP2022/065119, filed on Jun. 2, 2022, which is hereby incorporated herein by reference as if set forth in full.

TECHNICAL FIELD

The present disclosure generally relates to electrical energy storage systems. More particularly, the present disclosure relates to an auxiliary power supply arrangement for an electrical energy storage system.

BACKGROUND

Energy storage systems (ESSs) are systems for storing electrical energy in bulk. The electrical energy may have been generated by inconsistent generating means and, thus, ESSs conveniently provide a way to store generated electrical energy for later use, as desired, even if the generating means themselves are offline. As such, ESSs may form an important part of a renewable energy distribution grid comprising, for example, solar or wind generation.

ESSs may typically comprise energy storage units (ESUs) arranged into cabinets, where the term 'cabinet' may be thought of as a collection of interconnected ESUs. Each ESU may comprise one or more energy storage cells such as (super) capacitors or the like. Thus, the arrangement of ESUs into cabinets may advantageously provide a modularized ESS.

SUMMARY

The present disclosure relates to such an ESS, comprising an energy storage circuit including a string of interconnected ESUs configured to store electrical energy and provide power to a power grid using said stored electrical energy.

According to an aspect of the present disclosure, the ESS comprises an auxiliary module (AM) configured to provide auxiliary functions for at least one of the plurality of energy storage units. Said auxiliary functions may include carrying out measurements (e.g. electrical and/or thermal) in the ESU, monitoring of the ESUs, communicating data, for example between the ESUs and a central control unit, operating a protection system in the ESU if needed, and/or conducting diagnostics, to name some examples.

In order to perform such auxiliary functions, the AM(s) may require power. According to comparative examples not necessarily comprised in the state of the art, power for the AMs may be provided from the ESUs themselves, e.g. the same ESU(s) that the AM(s) are configured to provide auxiliary functions for.

However, according to such an arrangement, in order to power an AM, an ESU must first be energized. Hence, there may exist a time between energization of the ESU and provision of power from the ESU to the AM when the ESU is energized without the AM being able to provide at least some auxiliary functions to the ESU. Thus, the ESU may be at particular risk of failure or damage during such times of initial energization, being deprived during this time of the protection, monitoring, and similar auxiliary functions provided by the AM.

As such, according to the aforementioned aspect of the present disclosure, there is further provided an auxiliary power supply (APS) circuit for providing power to the auxiliary module from a grounded power source. In some examples, the grounded power source may source power from the same power grid that the ESUs of the ESS are configured to provide power to, but without sourcing power directly from the ESUs themselves. In other examples, the grounded power source may source power from a generator (e.g. a diesel generator or the like).

In any event, the use of a grounded power source that does not draw power directly from the ESUs may beneficially allow the AM(s) to be powered even when the ESUs are not energized. Thus, the ESUs may be energized and de-energized (i.e. have electrical energy provided thereto and drawn therefrom) whilst still having auxiliary functions provided thereto. The ESS may thus beneficially maintain protection systems, monitoring systems, etc. throughout operation, thereby improving the safety of operation of the ESS.

According to comparative examples not necessarily comprised in the state of the art, an auxiliary power supply circuit may form a direct electrical connection between the grounded power source and the AM(s). In such examples, the ESS may be limited in its ability to reach high voltages and thus potentially less suited for applications to power grid support, as an AM may have a direct electrical connection to the ESU(s) to which it provides auxiliary functions.

Thus, if the ESU (at relatively high potential) is electrically connected to the grounded power source via the auxiliary power supply circuit providing power to the AM, there may be a risk of electrical arcing from the ESU to ground (i.e. zero-potential) if the electrical energy stored in the ESU exceeds a threshold amount.

In an example ESS, having ESUs configured to provide power to a power grid (i.e. a 'grid-support ESS') and connected together on an energy storage circuit, said energy storage circuit may be at a potential of tens to thousands of kilovolts (10s-100s kV). At such a potential, any components in a path of direct electrical connection between the energy storage circuit and ground may be severely damaged by arcing. Therefore, it has been realized as part of the present disclosure that a grid-support ESS may require special adaptations in order to provide power from a grounded power source to AMs in said ESS.

Thus, according to the aforementioned aspect of the present disclosure, the auxiliary power supply circuit is configured to galvanically isolate the energy storage circuit from the grounded power source. As used herein, to 'galvanically isolate' means to electrically connect without a direct conduction path. By galvanically isolating the energy storage circuit from the grounded power source, the AMs may safely be powered by the grounded power source even if the ESUs are energized to high potentials (i.e. collectively storing amounts of electrical energy suitable for providing power to a power grid).

As part of the configuration of the APS circuit to galvanically isolate the energy storage circuit from the grounded power source, the APS may comprise at least one inductive coupling. Accordingly, power for the AMs may be beneficially sourced from the grounded power source without forming a direct conduction path with the APS circuit, which may be electrically connected or poorly insulated from the energy storage circuit.

The inductive coupling may be a non-resonant inductive coupling, such as an isolation transformer, or a resonant inductive coupling. A resonant inductive coupling may comprise, for example, a transmitter configured to inject a power signal into the energy storage circuit, and a receiver configured to receive the power signal on the energy storage circuit and convert the received power signal into power for the auxiliary module.

The inductive coupling may take any suitable form depending on the desired implementation, taking into account the amount of electrical potential needed to be isolated from ground, the amount of modularization required, maximum tolerated costs, and/or spatial limitations, to name but a few potentially consequential factors.

For example, the inductive coupling (or other means of galvanic isolation) may be arranged as part of a two-stage isolation. That is, the auxiliary power supply circuit comprises a primary unit, a primary circuit, a secondary unit, and a secondary circuit, wherein the primary circuit is galvanically isolated from the grounded power source by the primary unit, and the secondary circuit is connected to the auxiliary module and galvanically isolated from the primary circuit by the secondary unit. An inductive coupling may be in either or both of the primary unit and the secondary unit.

As a refinement of such an example, the auxiliary power supply circuit may comprise a plurality of primary circuits, each primary circuit being galvanically isolated from the grounded power source by a respective primary unit. Additionally or alternatively, the auxiliary power supply circuit may comprise a plurality of secondary circuits, each secondary circuit being galvanically isolated from a primary circuit by a respective secondary unit.

In some examples, either the primary or the secondary circuit may be connected to the energy storage circuit, with the other (i.e., secondary or primary, respectively) being connected to the AM(s).

As a further example, a resonant inductive coupling may inject a power signal that has a frequency higher than a characteristic frequency of the power grid (which may be, e.g., 50 Hz or 60 Hz), such that the transmitter and receiver may transmit and receive more electrical power whilst being beneficially smaller in form factor.

In case of failure, fault, or other interruption (temporary or otherwise) in the grounded power source, the APS circuit may be further configured to provide power from a backup power source such that the AMs are redundantly powered and the risk of AMs being depowered is advantageously reduced. Therefore, the safety of the ESS may be further enhanced. In some examples, the backup power source may be local to the AMs, and may preferably comprise an energy storage module from the string of energy storage modules.

The resilience of the auxiliary power circuit may be further improved by providing a modularized redundancy scheme. For example, if a plurality of primary (and/or secondary) circuits are implemented, a first auxiliary module may be provided with power via a first primary circuit, and a second auxiliary module adjacent to the first auxiliary module may be provided with power via a second primary circuit. The same solution can be readily conceived in respect 15 of secondary circuits.

Thus, the impact of failure of any primary (or secondary) circuit can be mitigated, as neighboring AMs may not all be powered on a same circuit. If coupled with the above-described optional feature, employing ESUs as backup power sources, a failed circuit may readily draw power from an adjacent ESU as a backup power source. Hence, a more resilient and safer ESS may be provided accordingly.

The solutions described herein may be applied to any power grid system that provides power to and/or source power from ESSs. By improving the safety and reliability of ESSs, the presently described solutions may consequently enhance the reliability of any power grid system in which they are installed.

BRIEF DESCRIPTION OF THE DRAWINGS

Exemplifying embodiments will now be described in more detail, with reference to the following appended drawings, wherein.

DETAILED DESCRIPTION

The present disclosure is laid out in the following by way of a number of illustrative examples. It will be appreciated that these examples are provided for illustration and explanation only and are not intended to be limiting on the scope of the present disclosure. Instead, the scope of the present disclosure is to be defined by the appended claims. Furthermore, although the examples may be presented in the form of individual embodiments, it will be recognized that the disclosure also covers combinations of the embodiments described herein.

Figure 1:
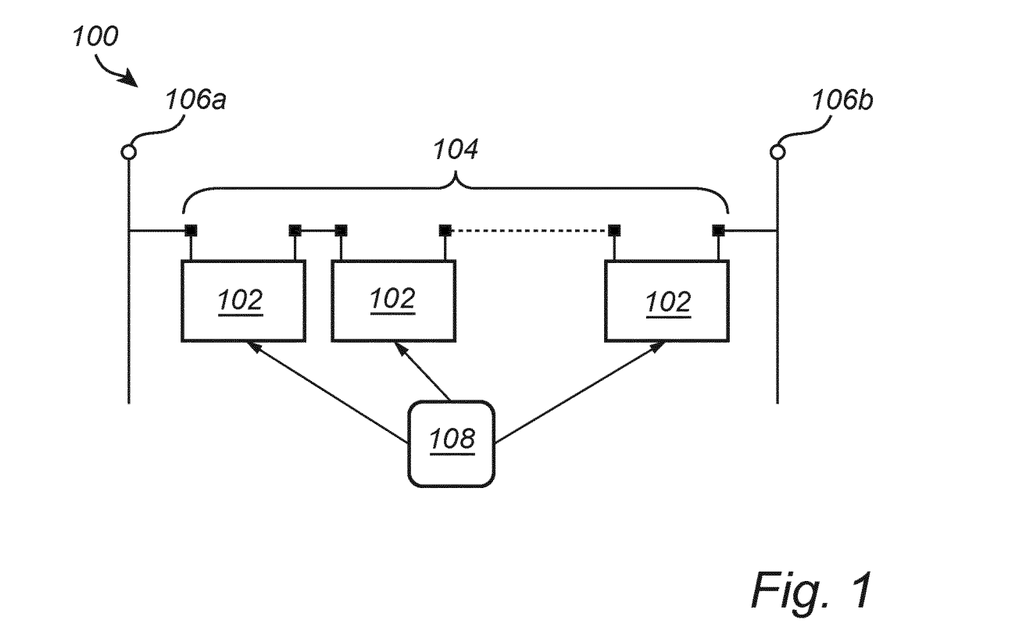
FIG. 1 schematically shows an energy storage system according to an embodiment.

FIG. 1 schematically shows an energy storage system 100 according to an embodiment of the present disclosure. The energy storage system 100 (ESS 100) may comprise a plurality of energy storage cabinets 102 (or simply 'cabinets 102') in a series connection, to form a bank 104 of energy storage cabinets 102 and thereby provide a modularized ESS 100.

The bank 104 of cabinets 102 may be connected between terminals 106a and 106b such that the bank 104 can be collectively charged and discharged via said terminals 106a, 106b. For example, the terminals 106a, 106b may be connected to a power grid and/or electrical energy generating means (not shown) such that the ESS 100 may store electrical energy (from electrical energy generating means and/or the power grid) and provide power to the power grid using said stored electrical energy.

It will be appreciated that, although only one series-connected bank 104 is shown, further banks 104 may be provided, connected either in series or parallel to the illustrated bank 104, between the terminals 106a, 106b.

The ESS 100 may further comprise a control unit 108 configured to provide various control functions for the ESS 100 such as power management, monitoring, and similar such functions. The control unit 108 may be local or remote to the bank 104 of cabinets 102 and may be connected (i.e. power and/or data connected) via any suitable wired or wireless means.

In an example implementation, the electrical generating means may comprise inconsistent renewable electrical energy generating means, such as wind turbines, solar panels, or the like, which do not generate electricity consistently. In such an implementation, the ESS 100 may advantageously be charged (i.e. provided with electrical energy, e.g. via the terminals 106a, 106b) by the electrical energy generating means during a time when electrical generation exceeds the demand from the power grid (i.e. it is not used immediately). The electrical energy may then be stored in the ESS 100 for later use.

Accordingly, at a time when the demand from a power grid exceeds the provision capacity of the electrical energy generating means, the supply of electrical energy may be supplemented using the electrical energy stored in the ESS 100. For example, the terminals 106 may be connected to a converter device (such as a STATCOM), which is configured for providing power to the power grid. Hence, a more flexible power grid may be provided by incorporating an ESS 100 in accordance with the present disclosure.

Figure 2:
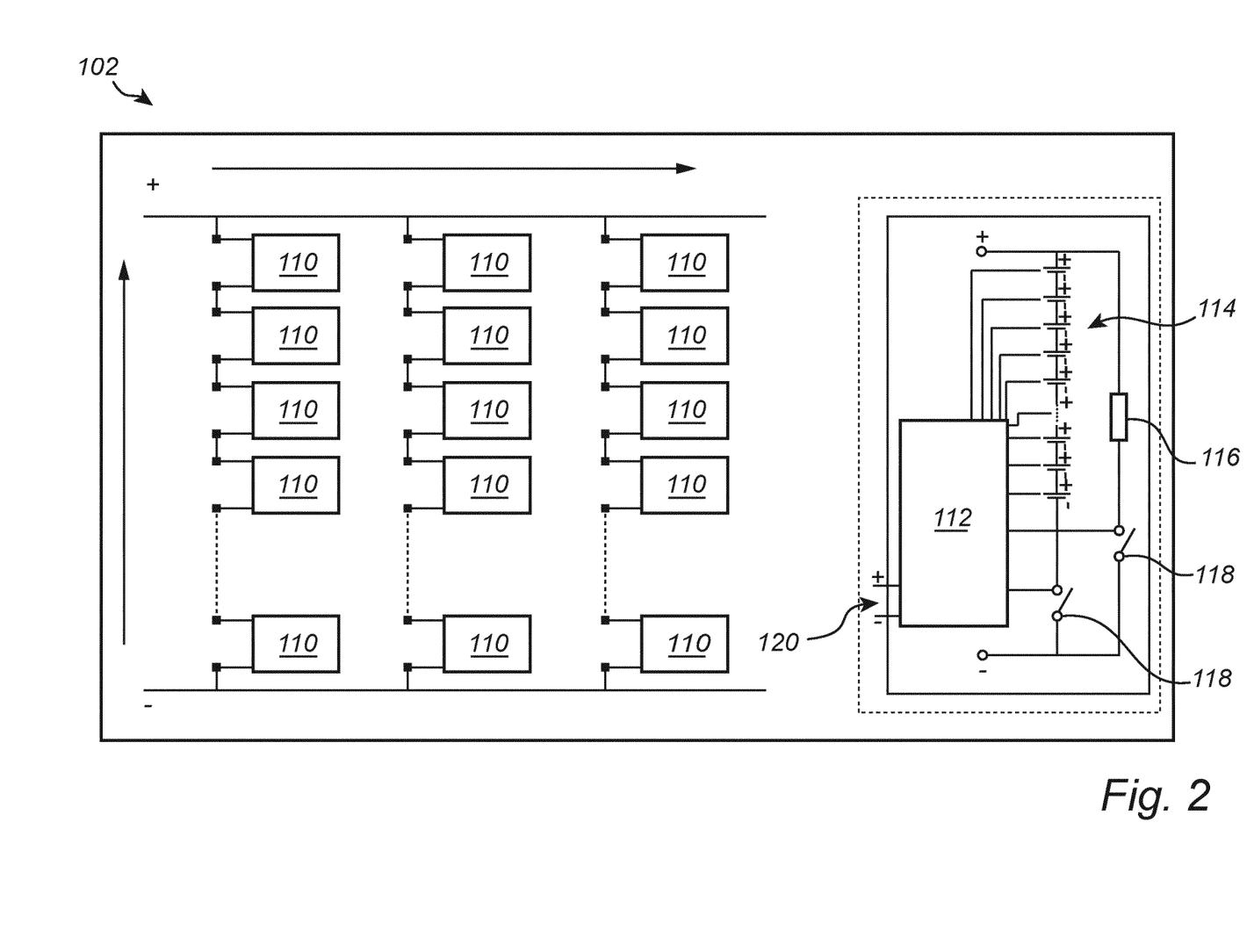
FIG. 2 schematically shows an example configuration of an energy storage unit, according to an embodiment.

An example configuration of a cabinet 102 such as those shown in FIG. 1 is shown in FIG. 2. As illustrated, a cabinet 102 may comprise a plurality of energy storage units 110 (ESUs 110) arranged into one or more strings 111, wherein a number of strings 111 of ESUs 110 may be connected, for example, in parallel to each other.

An example internal configuration of an ESU 110 is shown in an enlarged view, revealing an auxiliary module 112 (AM 112) configured to provide auxiliary functions for the ESU 110. The ESU may further comprise a plurality of cells 114, which may be (super) capacitors, batteries, or the like, and a protection and bypass system, which may comprise a discharge resistor 116 and a plurality of switches 118.

It will be appreciated that the protection and bypass system illustrated in FIG. 2 is just an example of possible systems that may be incorporated into the ESUs 110 for control and/or protection of power flow. Sensors, monitors, fuses, and/or other control, protection, or monitoring devices may also be included, depending on the particular implementation.

As illustrated by the dashed lines therefrom, the AM 112 may be configured to monitor and/or control one or more of the various internal components of the ESU 110. For example, the AM 112 may be communicatively coupled to each cell 114 and each switch 118 so as to identify faults (or failures or other interruptions, unintentional or otherwise) of cells 114 and take an appropriate action in response thereto.

To take one example, an AM 112 may monitor the health of the cells 114. If the AM 112 detects failure of a cell 114, the AM 112 may control one or more of the switches 118 to bypass the faulty cell(s) 114 (e.g. just the failed cell or a group of cells containing the failed cell 114), and the AM 112 may further connect the faulty cell(s) 114 to the discharge resistor 116 to thereby discharge the faulty cell(s) 114 and thus render the ESU 110 safer for maintenance, removal, or replacement.

As such, it will be appreciated that a proper functioning of AMs 112 may be important for the safe and reliable function of the ESS 100. Failures of cells 114 in ESUs 110 and other such potential faults in cabinets 102 may be more likely to occur during an energization of the ESS 100 (e.g. during initial charging thereof). Therefore, it may be preferable to ensure that the auxiliary functions provided by the AM 112 are operational before initiating such energization.

Hence, it may be preferred to constantly provide power to the AM 112, e.g. via AM power supply 120, or at least ensure that the power provided to the AM 112 is available before energization of the ESU 110.

As such, according to the present disclosure, there is provided an auxiliary power supply for auxiliary modules 112 in an ESS 100 that reliably provides power from a power source separate to the ESS 100 itself. That is, the ESUs 110 may not be relied upon for providing power to the AMs 112 as this may require energization of the ESUs 110 before auxiliary functions (including monitoring and/or protection functions such as those described above) are fully operational.

Hence, a safer and more reliable operation of the ESS 100 can be ensured according to the auxiliary power supply configuration described herein, specific examples and variations of which are described below in connection with FIGS. 3 to 7.

Figure 3:
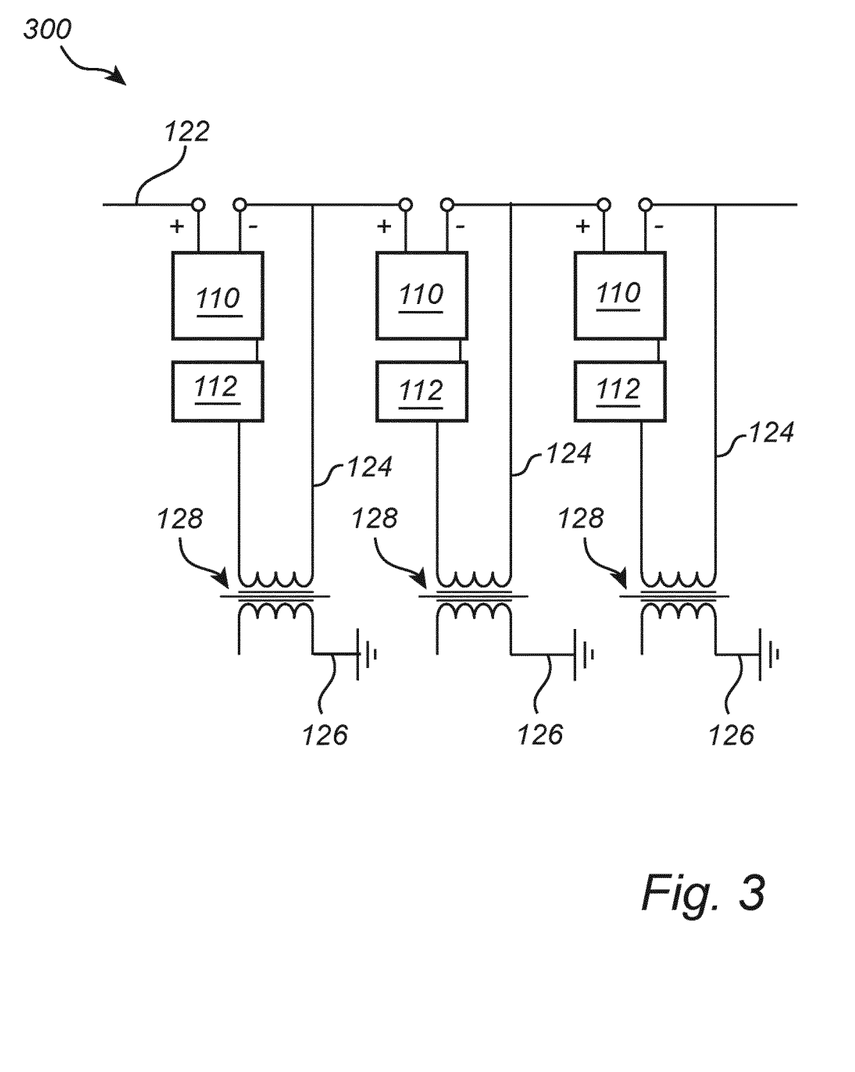
FIG. 3 schematically shows an example configuration of an energy storage circuit and an auxiliary power supply circuit, according to an embodiment.

FIG. 3 schematically shows an example circuit configuration 300, which may be incorporated into an ESS such as the ESS 100 described above in relation to FIGS. 1 and 2.

The circuit configuration 300 may comprise a string (or a subset of a string) of ESUs 110, each having an AM 112 connected thereto for providing auxiliary functions, as described above. The AMs 112 are illustrated as separate components to the ESUs 110 but they may also be contained with the ESUs 110 as internal components thereof, in some examples. Furthermore, although it is illustrated that each ESU 110 has its own associated AM 112, some example embodiments may configure an AM 112 to provide auxiliary functions to multiple ESUs 110.

The ESUs 110 are connected via direct electrical connections on an energy storage circuit 122. AMs 112 may be directly electrically connected to the ESUs 110, and thus to the energy storage circuit 122, or the AMs 112 may be poorly insulated from the energy storage circuit 122.

Therefore, if the ESUs 110 are collectively implemented as part of a power grid system as described above, the electrical potential caused by the large amounts of electrical energy stored in the ESUs 110 may be in the high voltage range (i.e. 10s of kV to 100s of kV).

The AMs are powered via an auxiliary power supply circuit 124, which may be connected (e.g. via a direct electrical connection) to the energy storage circuit 122. The auxiliary power supply circuit 124 may be configured to provide power to the AMs 112 from a grounded power source 126.

By sourcing power from a grounded power source 126, the AMs 112 may beneficially remain powered irrespective of the energization of the ESUs 110. Thus, the AMs 112 may be operational in providing auxiliary functions such as protection and monitoring, even before and during initial energization of the ESUs 110. This may provide a safer and more reliable ESS 100.

As the ESUs 110 have such a relatively high electrical potential (relative to ground, i.e. zero-potential), there will be a risk of arcing between the high-potential portions of the energy storage circuit 122—and the auxiliary power supply circuit 124 if it is connected or poorly insulated from the energy storage circuit 122—and the grounded power source 126.

As illustrated, the auxiliary power supply circuit 124 may thus be configured to galvanically isolate the energy storage circuit 124 from the grounded power source 126. As used herein, to 'galvanically isolate' a circuit from ground is intended to mean that no direct electrical connection is formed between said circuit and ground.

In the example shown, the galvanic isolation may be provided by a coupling 128, which may be an inductive coupling such as a resonant or non-resonant coupling. It will be appreciated that galvanic isolation may also be provided by capacitive couplings, reactive couplings, optic couplings, or other such couplings that provide galvanic isolation. However, it is realized as part of the present disclosure that the coupling 128 may preferably be an inductive coupling, which provides a beneficial balance between cost and size. For example, the coupling 128 may be an isolation transformer.

In the illustrated example of FIG. 3, each AM 112 is directly electrically connected to a respective auxiliary power supply circuit 124, each auxiliary power supply circuit 124 being galvanically isolated from a grounded power supply 126 by a respective coupling 128. In such an example, it will be appreciated that each coupling 128 may be required to isolate the total collective potential of the energy storage circuit 122 (having all ESUs 110 connected thereon) from ground, i.e. the grounded power source 126.

That is, each coupling 128 may be required to reliably isolate a potential of 10s of kV to 100s of kV from ground, i.e. prevent arcing across the coupling 128. Size and cost of couplings 128 may scale with the amount of potential required to be isolated from ground. Thus, the example configuration 300 shown in FIG. 3 may be relatively more expensive and less space-efficient than those shown in FIGS. 4 to 7.

Figure 4:
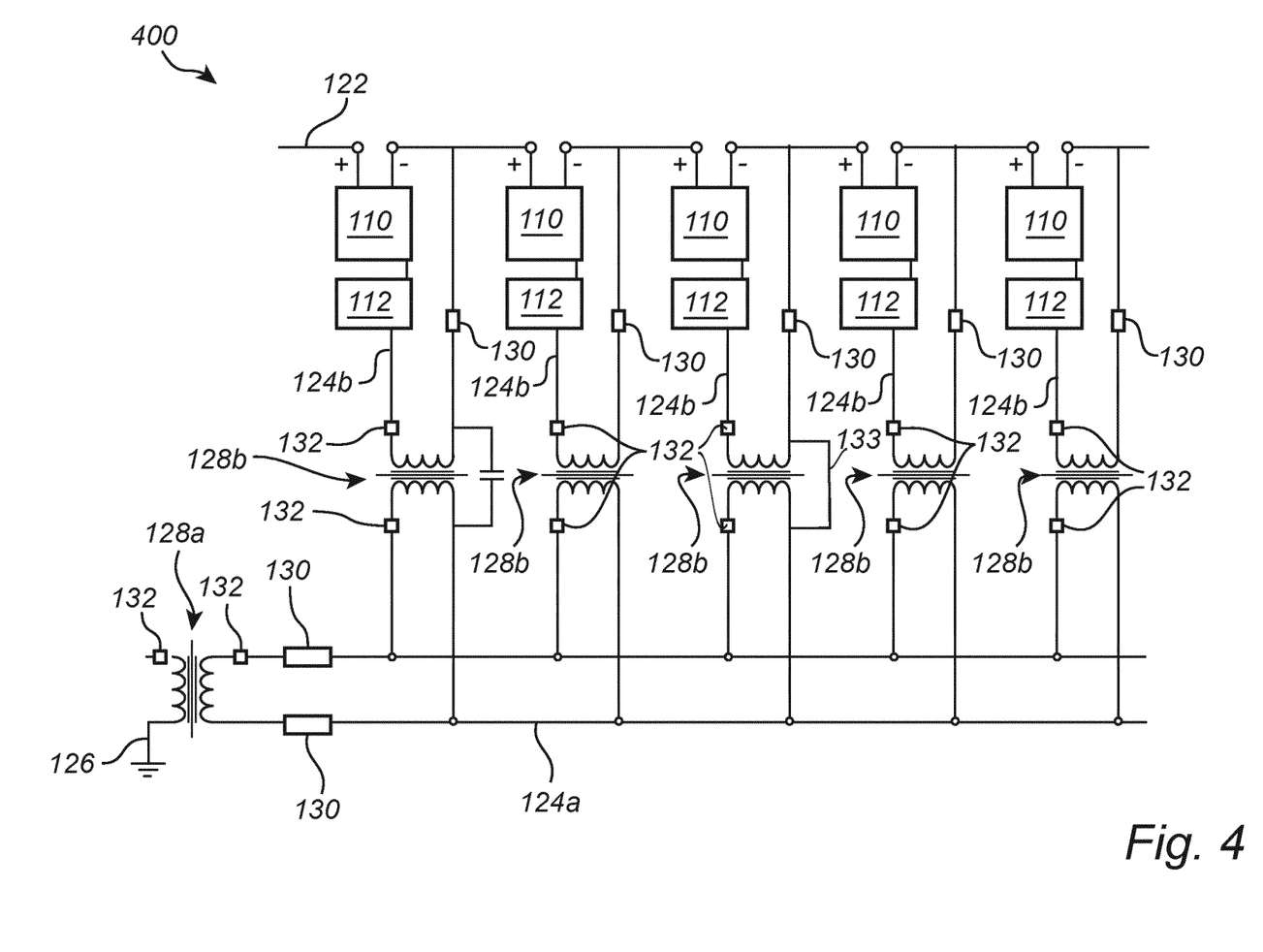
FIG. 4 schematically shows another example configuration of an energy storage circuit and an auxiliary power supply circuit, having two stages of isolation, according to an embodiment.

FIG. 4 shows an alternative circuit configuration 400 comprising two stages of isolation. More particularly, as illustrated in FIG. 4, and instead of each coupling 128 being configured to withstand the collective potential of the energy storage circuit 122, only one coupling 128 so-configured may be required.

According to the illustrated configuration 400, the auxiliary power circuit 124 comprises a primary circuit 124a and a plurality of secondary circuits 124b, each secondary circuit 124b providing power from the primary circuit 124a to a respective AM 112. The secondary circuits 124b are galvanically isolated from the primary circuit 124a via secondary couplings 128b (which may also be referred to as secondary units 128b) and the primary circuit 124 is galvanically isolated from the grounded power source 126 via a primary coupling 128a (which may also be referred to as primary unit 128a).

Each primary and secondary coupling 128a, 128b may be similar to the coupling 128 described in relation to FIG. 3—i.e., the couplings 128 (as the primary and secondary couplings 128a, 128b may be collectively referred to) may comprise resonant or non-resonant inductive couplings, for example.

However, only the primary coupling 128a may be configured to isolate the collective potential from the ESUs 110 on the energy storage circuit 122 from a ground potential. That is, the primary coupling 128a may provide power, in a galvanically isolated manner, to the primary circuit 124a, and the power may thereafter be distributed amongst the plurality of secondary circuits 124b.

Therefore, the secondary couplings 124b may not need to be configured for the entire voltage between the highest voltage of the energy storage circuit 122 and ground-only the voltage between the highest voltage of a subset of ESUs 110 and ground. In this example, the voltage potential to be isolated from ground by the secondary couplings 128b may be that corresponding to a single ESU 110, as each AM 112 for each ESU 110 is provided with its own corresponding secondary circuit 124b connected to the primary circuit 124a via its own secondary coupling 128b.

It will thus be appreciated that cost and space can be saved in respect of the secondary couplings 128b, whilst only one more expensive and larger primary coupling 128a may be used.

In some example variations, a plurality of primary circuits 124a may be provided, each being isolated from the grounded power source 126 by a respective primary coupling 128a, and each primary circuit 124a may then be coupled to one or more secondary circuits 124b via respective secondary couplings 128b. Said secondary circuits 124b may provide power to one or more AMs. Indeed, the number of secondary couplings 128b and the way they are connected to (a mesh of) ESUs 110 may be governed by requirements on cost, space limitations, and/or a maximum voltage isolation of the secondary circuit(s) 124b.

The circuit configuration 400 may further comprise, at any portion thereof, further components, e.g. serving as protective measures, as desired, such as resistors 130 and/or fuses 132.

Furthermore, in some examples, a bridging connection 133 may be provided across a secondary coupling 128b, so as to enforce the potential of the primary circuit 124a, thereby ensuring that a majority of the galvanic isolation is provided by the primary coupling 128a. This may allow for the secondary couplings 128b to be configured for providing galvanic isolation only between one or more neighboring ESUs 110.

Figure 5:
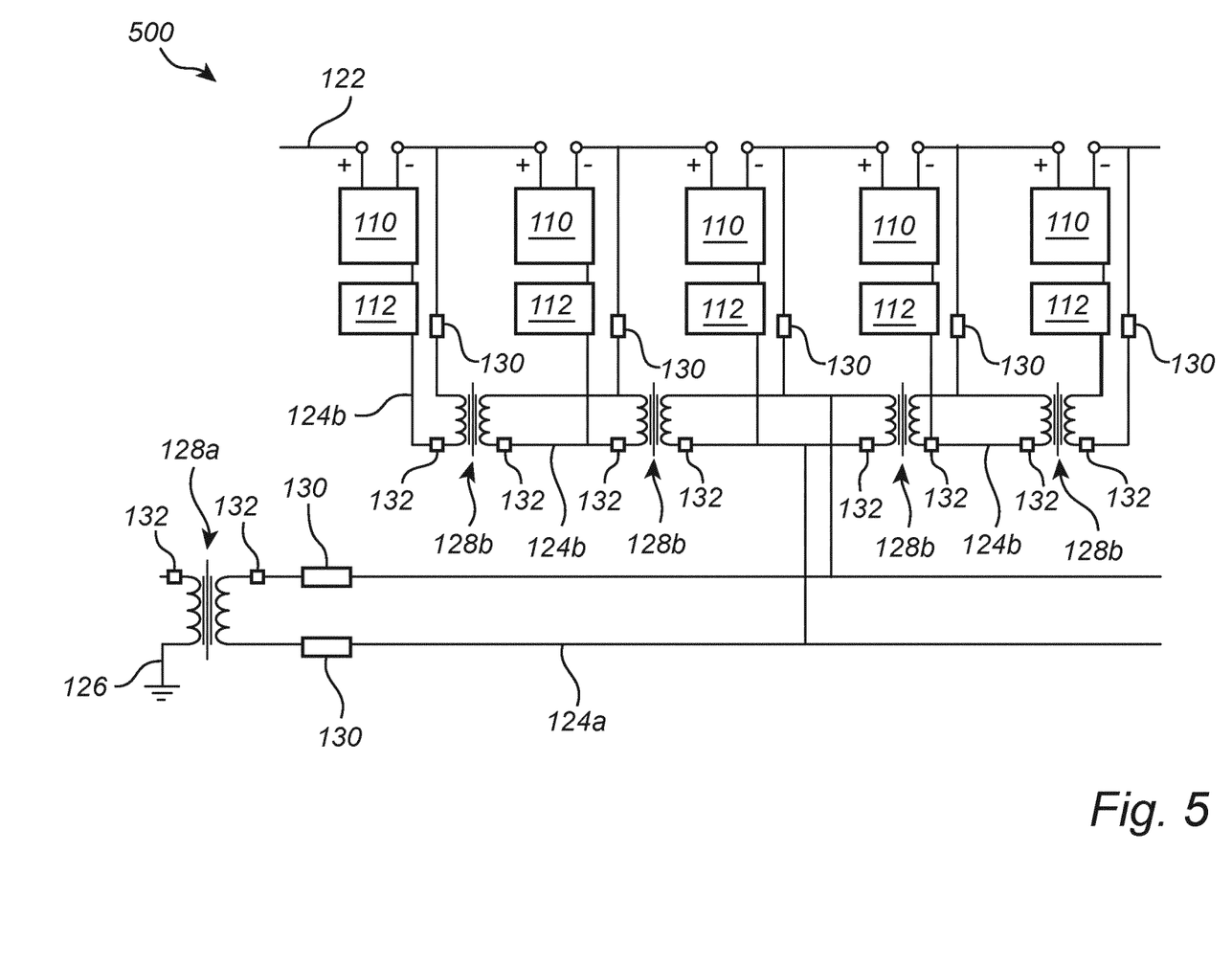
FIG. 5 schematically shows another example configuration of an energy storage circuit and an auxiliary power supply circuit, having primary and secondary stages of isolation, according to an embodiment.

FIG. 5 illustrates a variation on the configuration 400 of FIG. 4. The circuit configuration 500 shown in FIG. 5 employs an alternative connection of secondary circuits 124b, different to the connection shown in FIG. 4.

That is, the secondary circuits 124b in the configuration 400 may distribute power such that each secondary coupling 128b may be configured with the same power rating but may experience different voltage stress. By contrast, the secondary circuits 124b in the configuration 500 shown in FIG. 5 may distribute power such that each secondary coupling 128b may be configured with a different power rating but may experience the same voltage stress.

The configuration 500 illustrated in FIG. 5 may nonetheless share the beneficial properties as those discussed in respect of FIG. 4, in that fewer primary couplings 128a (which may be more expensive or larger) may be used, due to the use of a two-stage isolation, i.e. using primary circuit(s) 124a and secondary circuit(s) 124b as discussed above. In some examples, a combination of the different connections described above may be used, depending on the particular implementation.

Figure 6:
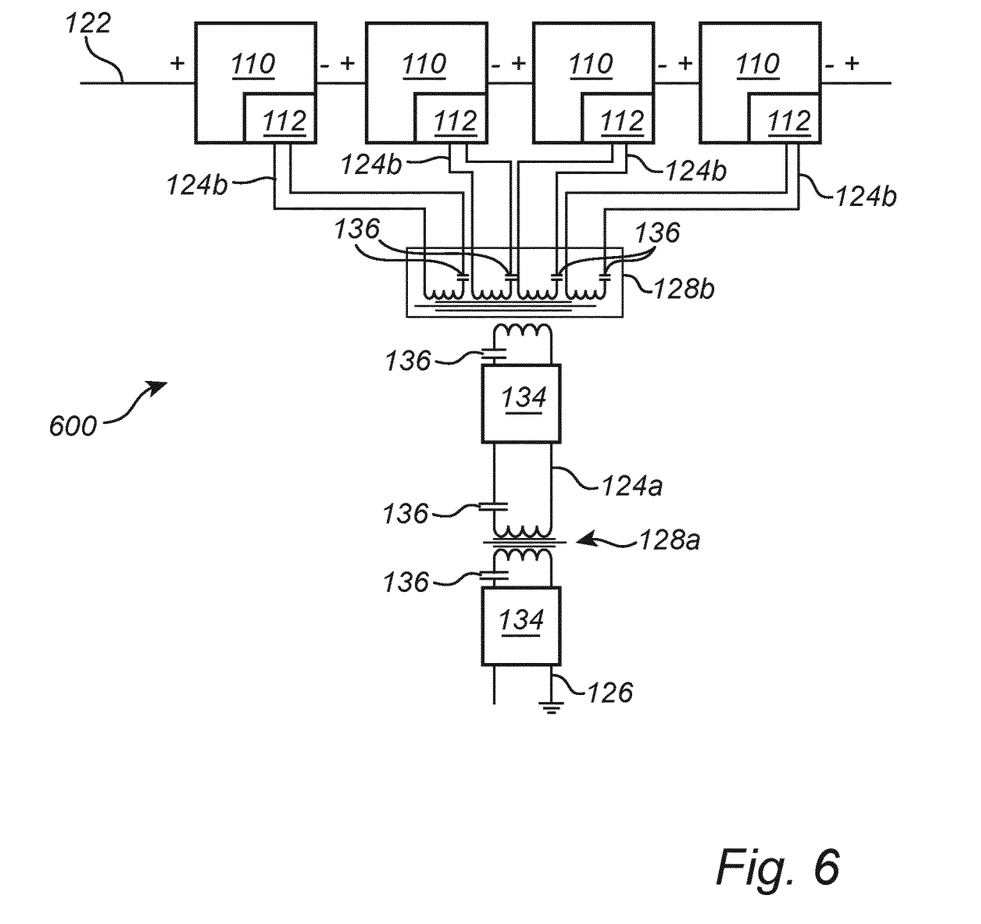
FIG. 6 schematically shows another example configuration of an energy storage circuit and an auxiliary power supply circuit, having primary and secondary circuits, according to an embodiment.

FIG. 6 shows an alternative circuit configuration 600 comprising a primary circuit 124a and a plurality of secondary circuits 128b sharing a same secondary coupling 128b. According to this illustrated example, the primary coupling 128a and/or the secondary coupling 128b may comprise resonant inductive couplings, which may also be referred to as a 'wireless power transfer means'.

The primary circuit 124a, circuitry on the ground-side, and/or the secondary circuit 124b may comprise additional coupling circuitry 134 for enabling or enhancing the wireless power transfer means. For example, the coupling circuitry may comprise means for changing a signal frequency, such that the characteristic frequency of the grounded power source 126 (e.g. a power grid) can be increased. For example, the additional coupling circuitry 134 may comprise power factor controllers (PFCs), rectifiers, and/or inverters.

Accordingly, the primary coupling 128a and/or secondary couplings 128b may be reduced in size, as the same power may be transmitted with a higher frequency, using a smaller resonant inductive coupling. The wireless power transfer means may be further enabled or enhanced by use of capacitors 136, which may introduce a resonance into circuits. According to such a coupling system, power may be inductively transferred from a transmitting antenna to a receiving antenna via impedance matching.

Figure 7:
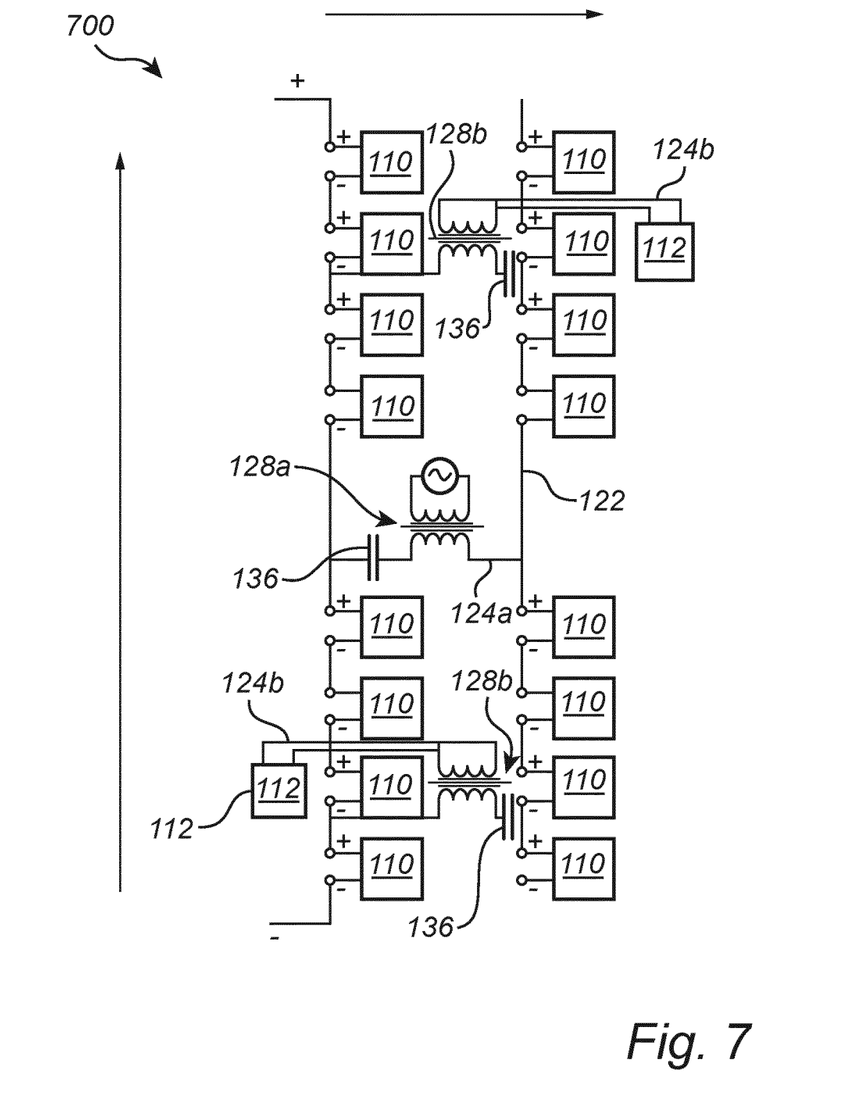
FIG. 7 schematically shows another example configuration of an energy storage circuit and an auxiliary power supply circuit, employing a resonant inductive coupling and an injected power signal, according to an embodiment.

FIG. 7 illustrates a further alternative configuration 700 for the auxiliary power supply circuit 124, a voltage (e.g. a high-frequency voltage signal), which may also be referred to as a power signal, is superimposed on the operating voltage of the ESUs 110 on the energy storage circuit 122, i.e. the voltage associated with the current flow of charging and discharging the ESUs 110 during normal operations of the ESS 100.

Accordingly, a primary circuit 124a comprising a capacitor 136 may be connected to the energy storage circuit 122 and galvanically isolated from a grounded power source 126 (e.g. an AC power grid) via a primary coupling 128a. The primary coupling 128a may comprise a transmitter configured to inject the power signal into the energy storage circuit 128a.

The primary coupling 128a, which may be acting as a high frequency external input, may be connected to a link between two ESUs 110, for example. The point of connection for this external input may thus be where the voltage to ground of the ESS 100 is at its lowest. In a unipolar system, this may occur on one end of the ESS 100 whereas, in a bipolar system, this point may be the midpoint of the ESS 100. Each primary coupling 128a (e.g. high frequency link transfer module) may be equipped with a transformer and a capacitor 136.

AMs 112 may then be connected to secondary circuits 124b being galvanically isolated from the energy storage circuit 122 (and thus galvanically isolated from the primary circuit 124a connected thereto) via a secondary coupling 128b. The secondary coupling may comprise a receiver for receiving the power signal and converting said power signal into power for the AM 112.

It will be appreciated that, if the AM(s) 112 contained components that required DC power, then the secondary coupling(s) 128b could be connected to, for example, an AC-DC converter, which may then feed DC power to the secondary circuit 124b.

The power signal may have a frequency higher than the characteristic frequency of the AC power grid acting as the grounded power source 126. Thus, the primary couplings 128a and/or secondary couplings 128b may be made smaller and less expensive than they would otherwise be required to be were the characteristic frequency of the AC power grid used as the frequency for the power signal.

It will be appreciated that all of the concepts disclosed above as alternative configurations may be combined in any manner of compatible ways, depending on the intended implementation.

Moreover, although schematically illustrated as being separate, the primary circuits 124a as well as secondary circuits 124b, and their respective couplings 128, may be placed in one unit, or separate units. In some examples, depending on the dielectric strength of the insulation, the secondary circuits 124b and/or secondary couplings 128b may be left floating. This may result in the primary couplings 128a and secondary couplings 128b both contributing in providing voltage isolation between the ESUs 110 and the grounded power source 126.

It may also be possible to have a common shield on the secondary circuit 124b and/or secondary coupling 128b and connect this to a point in the subsection of ESUs 110. In such a configuration, the secondary coupling 128b may only be required to provide voltage isolation between this point of connection and the ESU 110 that is vertically most distant from said point of connection.

Although some embodiments and example modifications thereof may have been presented in isolation herein, it will be appreciated that these embodiments and examples may be combinable in any form so as to achieve collective and/or synergistic advantages therefrom.

It will be appreciated that any combination of the above described example embodiments may advantageously allow for powering the auxiliary modules 112 for the ESUs 110 which may have (or 'be sitting on') a very high potential. According to the present disclosure, this advantage may be realized by transferring power from a grounded power source 126 via some means of galvanic isolation (e.g. a coupling 128).

In any event, it will be appreciated that the foregoing description has only listed a number of illustrative examples falling within the scope of the present disclosure, without necessarily defining the full breadth thereof. For the avoidance of doubt, the scope of the present disclosure is to be defined by the appended claims.

The invention claimed is:

1. An energy storage system (ESS), comprising:
an energy storage circuit comprising a string of interconnected energy storage units configured to store electrical energy and provide power to a power grid using said stored electrical energy;
an auxiliary module configured to provide auxiliary functions for at least one of the plurality of energy storage units; and
an auxiliary power supply circuit for providing power to the auxiliary module from a grounded power source;
wherein the auxiliary power supply circuit is configured to galvanically isolate the energy storage circuit from the grounded power source,
wherein:
the auxiliary power supply circuit comprises a primary unit, a primary circuit, a secondary unit, and a secondary circuit;
the primary circuit is connected to the energy storage circuit and galvanically isolated from the grounded power source by the primary unit; and
the secondary circuit is connected to the auxiliary module and galvanically isolated from the primary circuit by the secondary unit, and
wherein:
the primary unit comprises a transmitter configured to inject a power signal into the energy storage circuit; and
the secondary unit comprises a receiver configured to receive the power signal from the energy storage circuit and convert the received power signal into power for the auxiliary module.

2. The ESS according to claim 1, wherein: the auxiliary power supply circuit comprises at least one inductive coupling.

3. The ESS according to claim 2, wherein: the at least one inductive coupling comprises a resonant inductive coupling.

4. The ESS according to claim 1, wherein: the auxiliary power supply circuit comprises a plurality of primary circuits, each primary circuit being galvanically isolated from the grounded power source by a respective primary unit.

5. The ESS according to claim 4, wherein: the auxiliary power supply circuit comprises a plurality of secondary circuits, each secondary circuit being galvanically isolated from a primary circuit by a respective secondary unit.

6. The ESS according to claim 4, wherein:
- a first auxiliary module is provided with power via a first primary circuit; and
- a second auxiliary module adjacent to the first auxiliary module is provided with power via a second primary circuit.

7. The ESS according to claim 4, wherein: the primary unit and/or the secondary unit comprise a resonant inductive coupling.

8. The ESS according to claim 1, wherein: the power signal has a higher frequency than a characteristic frequency of the power grid.

9. The ESS according to claim 1, wherein: the auxiliary power supply circuit is further configured to provide power from a backup power source.

10. The ESS according to claim 9, wherein: the backup power source comprises an energy storage module from the string of energy storage modules.

11. A power grid system comprising the ESS according to claim 1, wherein the power grid system is configured to receive and distribute electrical energy from the ESS.

* * * * *